US006773164B2

(12) United States Patent
Meeker et al.

(10) Patent No.: US 6,773,164 B2
(45) Date of Patent: Aug. 10, 2004

(54) VEHICLE WHEEL BEARING AND WHEEL-SPEED-SENSOR CONNECTOR-PLUG BRACKET

(75) Inventors: Steven Eugene Meeker, Norwalk, OH (US); Todd Michael Kroeger, Hamilton, OH (US); Gerald Patrick Collins, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 49 days.

(21) Appl. No.: 10/101,762

(22) Filed: Mar. 20, 2002

(65) Prior Publication Data

US 2003/0179967 A1 Sep. 25, 2003

(51) Int. Cl.[7] ................................................ F16C 19/18
(52) U.S. Cl. ...................................................... 384/448
(58) Field of Search ................................ 384/448, 446, 384/444; 324/173, 174

(56) References Cited

U.S. PATENT DOCUMENTS 5,493,217 A * 2/1996 Stahl et al. ................. 324/173
6,408,669 B1 6/2002 Meeker et al.
6,485,187 B1 11/2002 Meeker et al.
6,574,865 B2 6/2003 Meeker et al.
6,575,535 B2 6/2003 Meeker et al.
6,622,377 B1 9/2003 Johnson et al.

* cited by examiner

*Primary Examiner*—Lenard A. Footland
(74) *Attorney, Agent, or Firm*—Michael D. Smith

(57) ABSTRACT

A wheel-speed-sensor connector-plug bracket and a vehicle wheel bearing including such bracket. The bracket is adapted for removable attachment to a sensor ring of a wheel speed sensor of a vehicle wheel bearing, is adapted for attachment to a non-bearing vehicle component, and is adapted for attaching thereto a connector plug of the wheel speed sensor. The wheel bearing includes a vehicle-wheel-bearing non-rotatable section and a wheel speed sensor having a sensor ring assembly. The sensor ring assembly has a sensor ring attached to the non-rotatable section, a connector plug adapted for electrical connection to a vehicle computer cable, an electrical conductor, and a bracket. The electrical conductor electrically connects the sensor ring to the connector plug. The bracket is adapted for removable attachment to the sensor ring, and is adapted for attachment to a non-bearing vehicle component. The connector plug is attachable to the bracket.

15 Claims, 4 Drawing Sheets

22
16
20
14
28
52
12
10
40
46
26
48
62
32
30

VEHICLE WHEEL BEARING AND WHEEL-SPEED-SENSOR CONNECTOR-PLUG BRACKET

TECHNICAL FIELD

The present invention relates generally to vehicles, and more particularly to a vehicle wheel bearing and to a wheel-speed-sensor connector-plug bracket.

BACKGROUND OF THE INVENTION

Vehicles include automotive vehicles having conventional wheel bearings wherein each wheel bearing includes a non-rotatable section (such as a bearing hub), a rotatable section (such as a bearing spindle) rotatably attached to the non-rotatable section, and wheel studs (also called stud bolts). The non-rotatable section typically is attached to a vehicle suspension system component. The stud bolt is press fitted into a through hole of the spindle flange. A vehicle wheel is placed on the stud bolts and secured by wheel nuts (also called lug nuts).

Some known wheel bearings include an anti-lock-braking-system (ABS) wheel speed sensor. The ABS wheel speed sensor has a target ring attached to the rotatable section of the vehicle wheel bearing and has a sensor ring assembly. The sensor ring assembly includes a sensor ring which senses the rotation of the target ring, a connector plug, and a pigtail wire having one end electrically connected to the sensor ring and having another end electrically connected to the connector plug. The connector plug is adapted for electrical connection to a vehicle ABS computer cable. The sensor ring is attached to the non-rotatable section of the vehicle wheel bearing. The plug is attached (via a "W-clip") to a bracket which is welded to the suspension system component (such as to a knuckle which is attached to a strut of the suspension system) to prevent undesired movement of the connector plug within the vehicle. Some applications call for separate right-side and left-side brackets for right-side and left-side suspension system components. The ABS computer cable is secured by grommets to routing notches in the bracket. The vehicle wheel bearing is shipped with the vehicle wheel speed sensor already incorporated into the rest of the wheel bearing. A temporary shipping shield is removably attached by a snap fit to the sensor-ring housing to protect/secure the pigtail wire and the connector plug. The plastic shipping shield is removed and discarded when assembling the bearing (including the connector plug) to the vehicle.

What is needed is an improved vehicle wheel bearing and an improved wheel-speed-sensor connector-plug bracket.

SUMMARY OF THE INVENTION

A first expression of an embodiment of the invention is for a vehicle wheel bearing including a vehicle-wheel-bearing non-rotatable section and a wheel speed sensor. The wheel speed sensor includes a sensor ring assembly. The sensor ring assembly has a sensor ring, a connector plug, an electrical conductor, and a bracket. The sensor ring is attached to the non-rotatable section. The connector plug is adapted for electrical connection to a vehicle computer cable. The electrical conductor electrically connects the sensor ring to the connector plug. The bracket is adapted for removable attachment to the sensor-ring housing and is adapted for attachment to a non-bearing vehicle component. The connector plug is attachable to the bracket.

A second expression of an embodiment of the invention is for apparatus including a wheel-speed-sensor connector-plug bracket. The bracket is adapted for removable attachment to a sensor ring of a wheel speed sensor of a vehicle wheel bearing. The bracket is also adapted for attachment to a non-bearing vehicle component. The bracket is further adapted for attaching thereto a connector plug of the wheel speed sensor.

Several benefits and advantages are derived from one or more of the expressions of an embodiment of the invention. Having a single bracket which functions as both a shipping shield and a bracket reduces the number of needed parts and eliminates having to discard a part after shipping.

DESCRIPTION OF THE PREFERRED EMBODIMENTS

Figure 1:
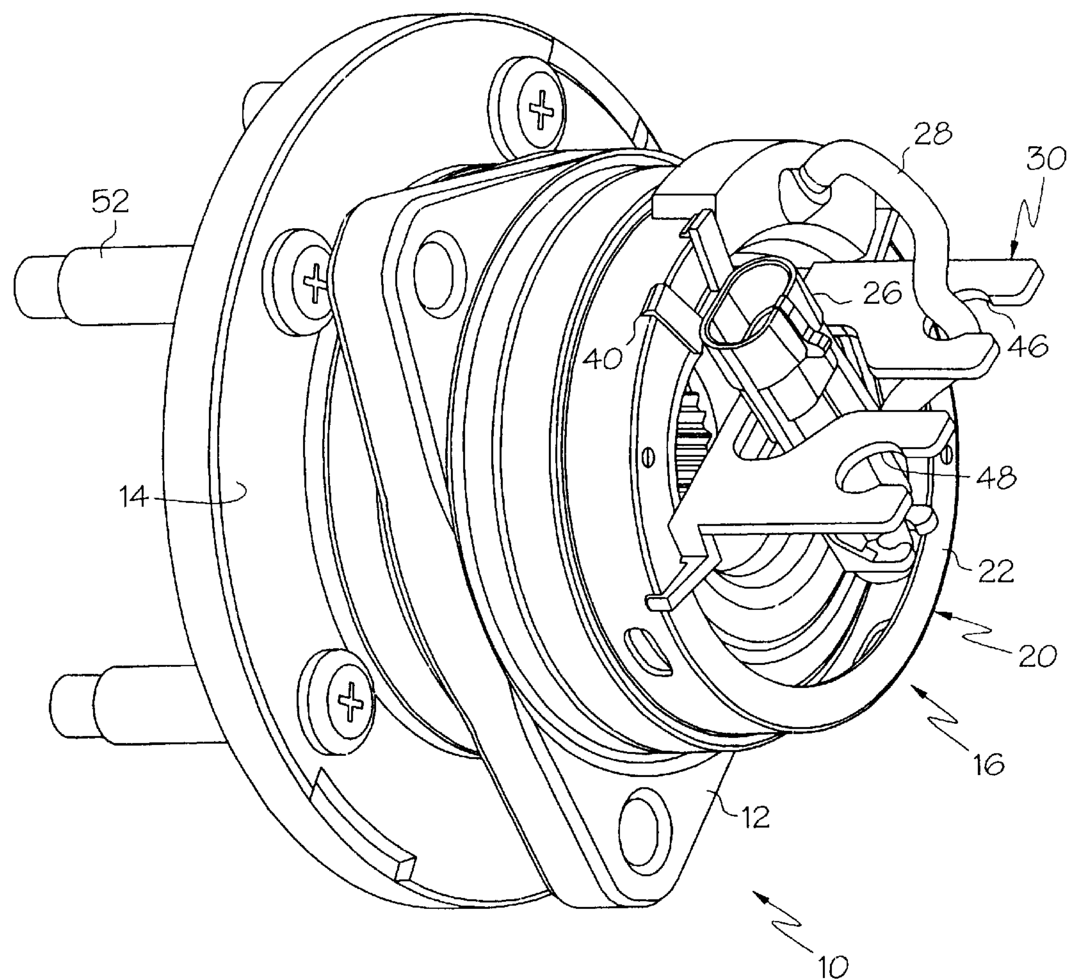
FIG. 1 is a perspective view of an embodiment of the invention showing a vehicle wheel bearing including a wheel-speed-sensor connector-plug bracket attached to the sensor ring and including the connector plug attached to the bracket.

Referring now to the drawings, FIGS. 1–4 illustrate an embodiment of the present invention. A first expression of the embodiment shown in the figures is for a vehicle wheel bearing 10 including a vehicle-wheel-bearing non-rotatable section 12, and a wheel speed sensor 16. The wheel speed sensor 16 includes a sensor ring assembly 20. The sensor ring assembly 20 has a sensor ring 22, a connector plug 26, an electrical conductor 28, and a bracket 30. The operation of a sensor ring for a vehicle wheel speed sensor, such as an anti-lock-braking-system (ABS) wheel speed sensor, is well known. The sensor ring 22 is attached to the non-rotatable section 12 of the vehicle wheel bearing 10. The connector plug 26 is adapted for electrical connection to a vehicle computer cable 32. It is understood that a connector plug includes, without limitation, prong-type and receptacle-type connector plugs and that a vehicle computer cable is any wire coming from a vehicle module which operates as a computer. The electrical conductor 28 electrically connects the sensor ring 22 to the connector plug 26. The bracket 30 is adapted for removable attachment to the sensor ring 22 and is adapted for attachment to a non-bearing vehicle component 34. By "removable attachment" is meant that the bracket 30 can be detached from the sensor ring 22 without damaging the bracket 30 or the sensor ring 22 or both. The connector plug 26 is attachable to the bracket 30.

Figure 2:
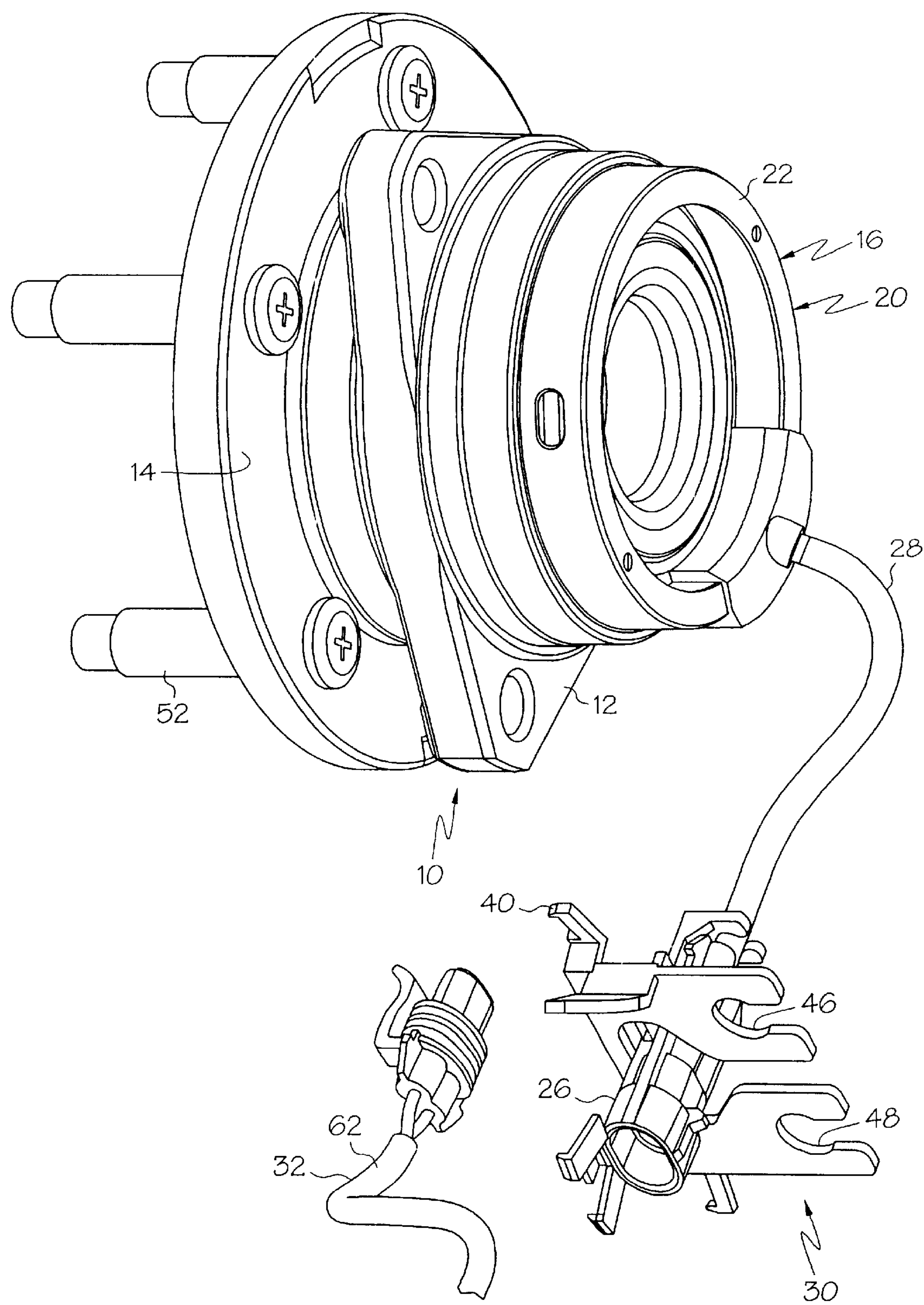
FIG. 2 is a perspective view of the vehicle wheel bearing of FIG. 1, but with the bracket detached from the bearing and the electrical conductor removed from the routing notches of the bracket and with a vehicle computer cable about to be electrically connected to the connector plug.
Figure 3:
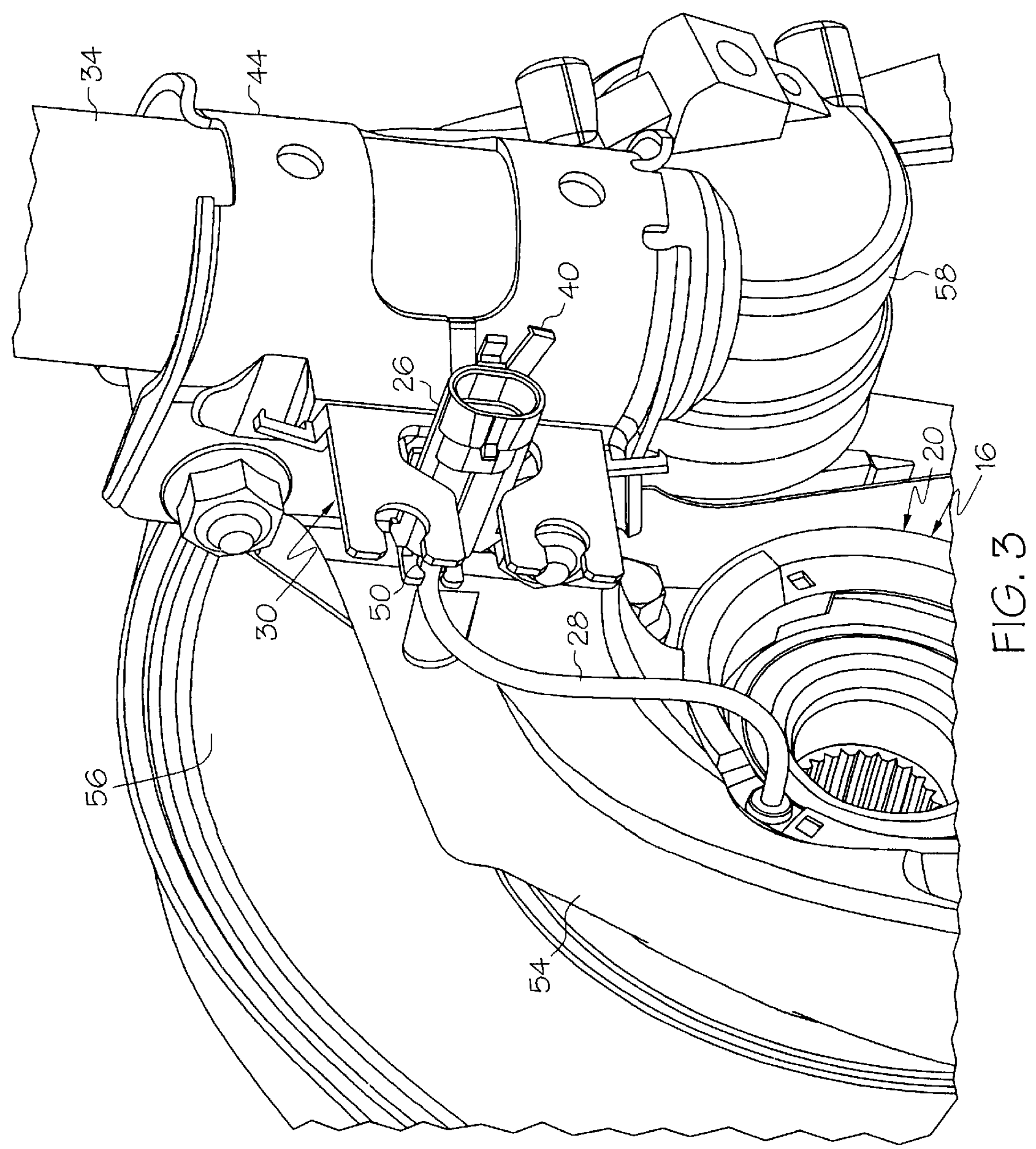
FIG. 3 is perspective view of a portion of the vehicle wheel bearing of FIG. 1 together with a suspension system member and brake components, wherein the bracket is attached to the suspension system member.

In one example of the first expression of the embodiment shown in the figures, the connector plug 26 is attached to the bracket 30. In one application, the connector plug 26 remains attached to the bracket 30 when the bracket 30 is attached to the sensor ring 22 (as seen in FIG. 1), when the bracket 30 is removed from the sensor ring 22 (as seen in FIG. 2), and when the bracket 30 is attached to the non-bearing vehicle component 34 (as seen in FIG. 3). In one construction, the bracket 30 includes an attachment rail 36, and the connector plug 26 is attached to the attachment rail 36. In one method, the connector plug 26 is adapted (via grooves, not shown) to be slidingly attached to the attachment rail 36, wherein a nub (not shown) on the connector plug 26 engages a slot 38 on the attachment rail 36 to prevent the connector plug 26 from disengaging itself from the attachment rail 36 as a result of vibrations experienced during vehicle operation.

Figure 4:
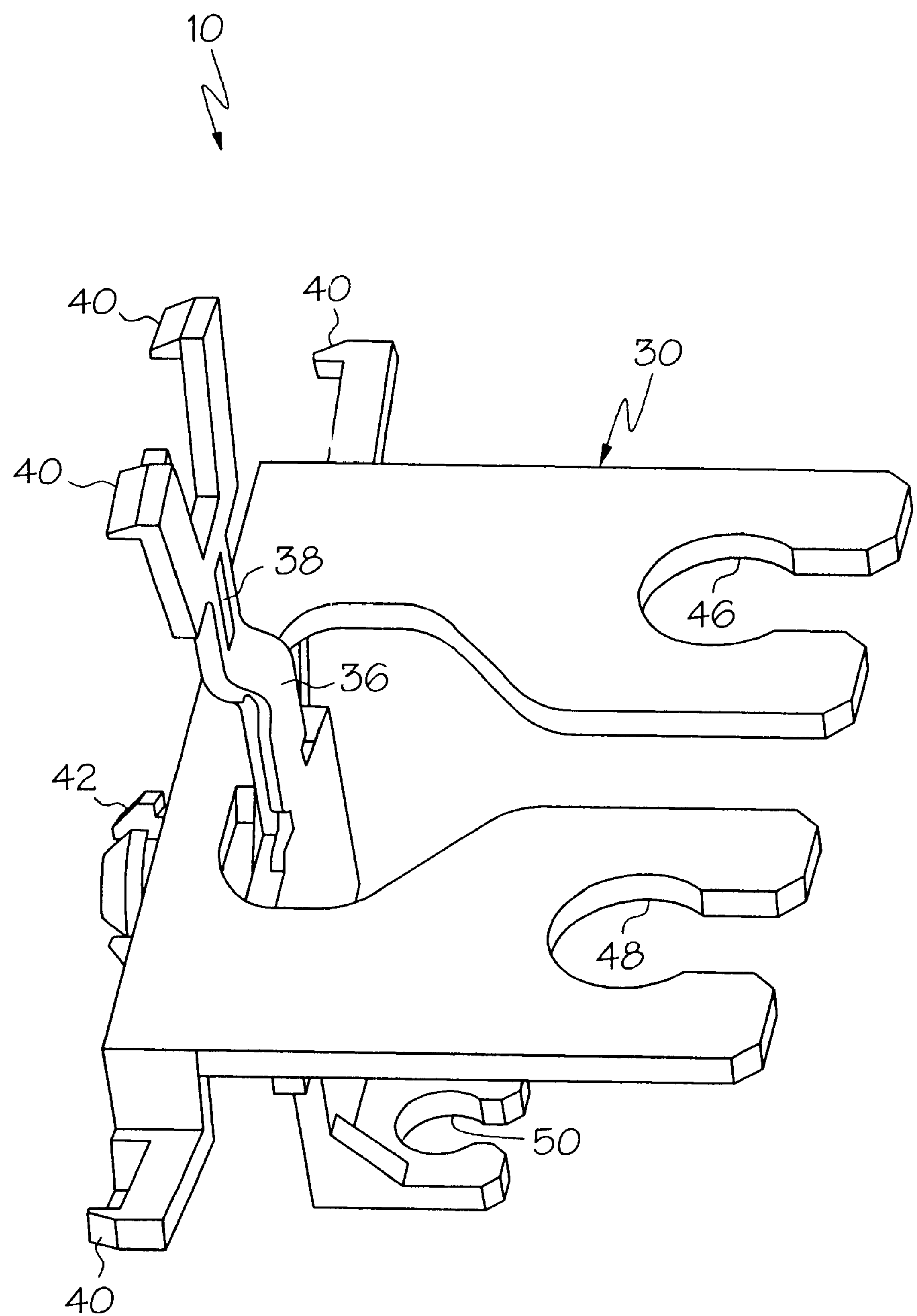
FIG. 4 is a perspective view of the bracket of FIG. 1.

In one implementation of the embodiment shown in the figures, the bracket 30 includes a snap-fit portion 40 (best seen in FIG. 4) which is removably attachable by a snap fit to the sensor ring 22 (such attachment seen in FIG. 1). The number and design of the snap-fit portion 40 (four prong-type snap-fit portions are shown in FIG. 4) including, without limitation, the size and shape (e.g., prong, receptacle, or other shape) are left to the artisan. In one construction, the bracket 30 consists essentially of plastic and, in one variation, the bracket 30 is a monolithic bracket. Other designs, not shown, for removably attaching the bracket to the sensor-ring housing are left to the artisan.

In the same or a different implementation of the first expression, the bracket 30 includes a snap-fit portion 42 (seen in FIG. 4) which is attachable by a snap fit to the non-bearing vehicle component 34 (such attachment seen in FIG. 3). The number and design of the snap-fit portion 42 (one mushroom-type snap-fit portion is shown in FIG. 4) including, without limitation, the size and shape (e.g., prong, receptacle, or other shape) are left to the artisan. In one application, the non-bearing vehicle component 34 is a suspension-system member such as a suspension-system strut 44. Other designs, not shown, for attaching the bracket to the non-bearing vehicle component and other types of non-bearing vehicle components 34 (including non-suspension-system components) are left to the artisan, including designs (not shown) wherein one or more of the bracket attachment portions are used to attach the bracket (at separate times) both to the sensor-ring housing and to the non-bearing vehicle component.

In one enablement of the first expression of the embodiment shown in the figures, the bracket 30 includes a notch 46 and 48 (two such notches are shown in the figures) adapted for routing the vehicle computer cable 32 (such routing not shown in FIG. 3). In the same or a different enablement, the bracket 30 includes a notch 46 and 50 (two such notches are shown in the figures) adapted for routing the electrical conductor 28 (one such routing through notch 46 is shown in FIG. 1). One example, without limitation, of the electrical conductor 28 is a pigtail-wire type of electrical conductor having one end electrically connected to the sensor ring 22 and having another end electrically connected to the connector plug 26. The number, shape, and location of the notches and the type of electrical conductor are left to the artisan.

In one design of the first expression of the embodiment shown in the figures, the non-bearing vehicle component 34 is a right-side or left-side suspension-system member (such as a strut 44), and the bracket 30 is symmetric in that the bracket 30 is rotatable 180 degrees for attachment to the right-side or left-side suspension-system member so that the connector plug 26 points in substantially the same direction and is disposed at substantially the same distance from the right-side or left-side suspension-system member when the connector plug 26 is attached to the bracket 30 and the bracket 30 is attached to the right-side or left-side suspension-system member (such as a strut 44). Such symmetry is seen by holding FIG. 3 up to a mirror.

In one implementation of the first expression of the embodiment shown in the figures, the vehicle wheel bearing 10 includes a rotatable section 14 which is rotatably attached to the non-rotatable section 12, and the wheel speed sensor 16 is an anti-lock-braking-system (ABS) wheel speed sensor. In one construction of the first expression, wheel studs 52 are attached to the rotatable section 14 of the vehicle wheel bearing 10. A wheel (not shown) is attached to the wheel studs 52 by using lug nuts (not shown). In one example, the non-rotatable section 12 is a hub, and the rotatable section 14 is a spindle. Other implementations and bearing-section examples are left to the artisan.

In one method of vehicle assembly, the vehicle wheel bearing 10 is brought as an assembled unit to have its non-rotatable section 12 attached to the vehicle suspension system knuckle 54. The vehicle computer cable 32 is electrically connected to the connector plug 26. A brake rotor 56 and a vehicle wheel (not shown) are attached to the wheel studs 52. It is noted that the non-rotatable section 12 is bidden between the knuckle 54 and the brake rotor 56 in FIG. 3, and that the term strut 44 includes, without limitation, a strut mounting bracket. A brake caliper 58 is also shown in FIG. 3. Other methods of vehicle assembly are left to the artisan.

A second expression of the embodiment shown in the figures is for apparatus 60 including a wheel-speed-sensor connector-plug bracket 30. The bracket 30 is adapted for removable attachment to a sensor ring 22 of a wheel speed sensor 16 of a vehicle wheel bearing 10. The bracket 30 is also adapted for attachment to a non-bearing vehicle component 34. The bracket 30 is further adapted for attaching thereto a connector plug 26 of the wheel speed sensor 16.

In one example of the second expression of the embodiment shown in the figures, the connector plug 26 is attached to the bracket 30. In one construction, the bracket 30 includes an attachment rail 36, and the connector plug 26 is attached to the attachment rail 36.

In one implementation of the second expression of the embodiment shown in the figures, the bracket 30 includes a snap-fit portion 40 (best seen in FIG. 4) which is removably attachable by a snap fit to the sensor ring 22 (such attachment seen in FIG. 1).

In the same or a different implementation of the second expression, the bracket 30 includes a snap-fit portion 42 (seen in FIG. 4) which is attachable by a snap fit to the non-bearing vehicle component 34 (such attachment seen in FIG. 3). In one application, the non-bearing vehicle component 34 is a suspension-system member such as a strut 44.

In one enablement of the second expression of the embodiment shown in the figures, the connector plug 26 is electrically connectable to a vehicle wire 62, and the bracket 30 includes a notch 46 and 48 (two such notches are shown in the figures) adapted for routing the vehicle wire 58 (such routing not shown in FIG. 3). In the same or a different enablement, the bracket 30 includes a notch 46 and 50 (two such notches are shown in the figures) adapted for routing an electrical conductor 28 (one such routing through notch 46 is shown in FIG. 1) which electrically connects a sensor ring 22 of the wheel speed sensor 16 to the connector plug 26.

In one design of the second expression of the embodiment shown in the figures, the non-bearing vehicle component 34 is a right-side or left-side suspension-system member (such as a strut 44), and the bracket 30 is symmetric in that the bracket 30 is rotatable 180 degrees for attachment to the right-side or left-side suspension-system member so that the connector plug 26 points in substantially the same direction and is disposed at substantially the same distance from the right-side or left-side suspension-system member when the connector plug 26 is attached to the bracket 30 and the bracket 30 is attached to the right-side or left-side suspension-system member (such as a strut 44). Such symmetry is seen by holding FIG. 3 up to a mirror.

In one implementation of the second expression of the embodiment shown in the figures, the wheel speed sensor 16 is an anti-lock-braking-system (ABS) wheel speed sensor.

The bracket 30 is not limited to an ABS-type of wheel speed sensor, as can be appreciated by those skilled in the art. The vehicle wire 62, to which the connector plug 26 is adapted for electrical connection, is not limited to a vehicle computer cable. In one example, the vehicle wire 62 is a speedometer wire. Other examples are left to the artisan. The discussion of the bracket 30 given in the first expression of the embodiment shown in the figures is equally applicable to the second expression of the embodiment shown in the figures.

Several benefits and advantages are derived from one or more of the expressions of an embodiment of the invention. Having a single bracket which functions as both a shipping shield and a bracket reduces the number of needed parts and eliminates having to discard a part after shipping. The example having an optional snap fit to attach the bracket to the non-bearing vehicle component eliminates having to weld the bracket for such attachment. The example of the bracket having the optional attachment rail eliminates the need for a "W-clip" to attach the connector plug to the bracket. The example having optional routing notches in the bracket helps protect the electrical conductor from damage during shipping and helps protect the vehicle wire from damage during vehicle operation. The example having an optionally-symmetric bracket eliminates the need for separate right-side and left-side brackets.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. Apparatus comprising a wheel-speed-sensor connector-plug bracket, wherein the bracket has a snap-fit portion which is removably attachable by a snap fit to a sensor ring of a wheel speed sensor of a vehicle wheel bearing, wherein the bracket has a snap-fit portion which is attachable by a snap fit to a suspension-system member, wherein the bracket has an attachment rail, and wherein a connector plug of the wheel-speed sensor is attachable to the attachment rail.

2. Apparatus comprising a wheel-speed-sensor connector-plug bracket adapted for removable attachment to a sensor ring of a wheel speed sensor of a vehicle wheel bearing, adapted for attachment to a non-bearing vehicle component, and adapted for attaching thereto a connector plug of the wheel speed sensor, wherein the non-bearing vehicle component is a right-side or left-side suspension-system member, and wherein the bracket is symmetric in that the bracket is rotatable 180 degrees for attachment to the right-side or left-side suspension-system member so that the connector plug points in substantially the same direction and is disposed at substantially the same distance from the right-side or left-side suspension-system member when the connector plug is attached to the bracket and the bracket is attached to the right-side or left-side suspension-system member.

3. Apparatus comprising a wheel-speed-sensor connector-plug bracket adapted for removable attachment to a sensor ring of a wheel speed sensor of a vehicle wheel bearing, adapted for attachment to a non-bearing vehicle component, and adapted for attaching thereto a connector plug of the wheel speed sensor, wherein the bracket includes a notch adapted for routing an electrical conductor which electrically connects a sensor ring of the wheel speed sensor to the connector plug.

4. A vehicle wheel bearing comprising:

a) a vehicle-wheel-bearing non-rotatable section; and b) a wheel speed sensor including a sensor ring assembly having:

(1) a sensor ring attached to the non-rotatable section;

(2) a connector plug adapted for electrical connection to a vehicle computer cable;

(3) an electrical conductor electrically connecting the sensor ring to the connector plug; and (4) a bracket adapted for removable attachment to the sensor ring and adapted for attachment to a non-bearing vehicle component, wherein the connector plug is attachable to the bracket and wherein the bracket includes a snap-fit portion which is removably attachable by a snap fit to the sensor ring.

5. A vehicle wheel bearing comprising:

a) a vehicle-wheel-bearing non-rotatable section; and b) a wheel speed sensor including a sensor ring assembly having:

(1) a sensor ring attached to the non-rotatable section;

(2) a connector plug adapted for electrical connection to a vehicle computer cable;

(3) an electrical conductor electrically connecting the sensor ring to the connector plug; and (4) a bracket adapted for removable attachment to the sensor ring and adapted for attachment to a non-bearing vehicle component, wherein the connector plug is attachable to the bracket and wherein the bracket includes a snap-fit portion which is attachable by a snap fit to the non-bearing vehicle component.

6. The vehicle-wheel bearing of claim 5, wherein the non-bearing vehicle component is a suspension-system strut.

7. The vehicle-wheel bearing of claim 5, wherein the bracket includes a snap-fit portion which is removably attachable by a snap fit to the sensor ring.

8. A vehicle wheel bearing comprising:

a) a vehicle-wheel-bearing non-rotatable section; and b) a wheel speed sensor including a sensor ring assembly having:

(1) a sensor ring attached to the non-rotatable section;

(2) a connector plug adapted for electrical connection to a vehicle computer cable;

(3) an electrical conductor electrically connecting the sensor ring to the connector plug; and (4) a bracket adapted for removable attachment to the sensor ring and adapted for attachment to a non-bearing vehicle component, wherein the connector plug is attachable to the bracket and wherein the bracket includes a notch adapted for routing the vehicle computer cable.

9. A vehicle wheel bearing comprising:

a) a vehicle-wheel-bearing non-rotatable section; and b) a wheel speed sensor including a sensor ring assembly having:

(1) a sensor ring attached to the non-rotatable section;

(2) a connector plug adapted for electrical connection to a vehicle computer cable;

(3) an electrical conductor electrically connecting the sensor ring to the connector plug; and (4) a bracket adapted for removable attachment to the sensor ring and adapted for attachment to a non-bearing vehicle component, wherein the connector plug is attachable to the bracket and wherein the bracket includes a notch adapted for routing the electrical conductor.

10. A vehicle wheel bearing comprising:

a) a vehicle-wheel-bearing non-rotatable section; and b) a wheel speed sensor including a sensor ring assembly having:

(1) a sensor ring attached to the non-rotatable section;

(2) a connector plug adapted for electrical connection to a vehicle computer cable;

(3) an electrical conductor electrically connecting the sensor ring to the connector plug; and (4) a bracket adapted for removable attachment to the sensor ring and adapted for attachment to a non-bearing vehicle component, wherein the connector plug is attachable to the bracket, wherein the non-bearing vehicle component is a right-side or left-side suspension-system member, and wherein the bracket is symmetric in that the bracket is rotatable 180 degrees for attachment to the right-side or left-side suspension-system member so that the connector plug points in substantially the same direction and is disposed at substantially the same distance from the right-side or left-side suspension-system member when the connector plug is attached to the bracket and the bracket is attached to the right-side or left-side suspension-system member.

11. Apparatus comprising a wheel-speed-sensor connector-plug bracket adapted for removable attachment to a sensor ring of a wheel speed sensor of a vehicle wheel bearing, adapted for attachment to a non-bearing vehicle component, and adapted for attaching thereto a connector plug of the wheel speed sensor, wherein the bracket includes a snap-fit portion which is removably attachable by a snap fit to the sensor ring.

12. Apparatus comprising a wheel-speed-sensor connector-plug bracket adapted for removable attachment to a sensor ring of a wheel speed sensor of a vehicle wheel bearing, adapted for attachment to a non-bearing vehicle component, and adapted for attaching thereto a connector plug of the wheel speed sensor, wherein the bracket includes a snap-fit portion which is attachable by a snap fit to the non-bearing vehicle component.

13. The apparatus of claim 12, wherein the non-bearing vehicle component is a suspension-system member.

14. The apparatus of claim 13, wherein the bracket includes a snap-fit portion which is removably attachable by a snap fit to the sensor ring.

15. Apparatus comprising a wheel-speed-sensor connector-plug bracket adapted for removable attachment to a sensor ring of a wheel speed sensor of a vehicle wheel bearing, adapted for attachment to a non-bearing vehicle component, and adapted for attaching thereto a connector plug of the wheel speed sensor, wherein the connector plug is electrically connectable to a vehicle wire, and wherein the bracket includes a notch adapted for routing the vehicle wire.

* * * * *